3,408,225
GLASS FIBERS SIZED WITH POLYCARBONATE
Hugo Streib and Wilhelm Hechelhammer, Krefeld-Bockum, Germany, assignors to Farbenfabriken Bayer Aktiengesellschaft, Leverkusen, Germany, a German corporation
No Drawing. Filed July 31, 1964, Ser. No. 386,738
Claims priority application Germany, Aug. 3, 1963, F 40,408; Nov. 29, 1963, F 41,418
8 Claims. (Cl. 117—126)

ABSTRACT OF THE DISCLOSURE

Glass fibers sized with from about 0.5 to about 5 percent by weight of a polycarbonate.

---

The present invention relates to glass fibers and more particularly to an improved method of producing glass fibers containing a sizing.

It has been proposed heretofore to prepare glass fibers and glass textiles. Furthermore, it has been known heretofore to size glass fibers for example, with starch, chromium complex compounds, reaction products of unsaturated polyamides with epoxy resins, butadiene-styrene copolymers, silanes and the like. Sometimes, the sizing materials are mixed with polyvinyl alcohols, plasticizers, antistatic materials, lubricants or the like. Glass fibers sized in the foregoing manner leave much to be desired for their hand and for technical applications for example, as filters and the like.

It is, therefore, an object of this invention to provide an improved glass fiber sizing and an improved sized glass fiber material. Another object of this invention is to provide an improved glass fiber textile sized to have a more attractive appearance and a more pleasant hand. Another object of this invention is to provide an improved method of filling the pores in the surface of glass fibers. A further object of this invention is to provide an improved method of glazing glass fibers to improve their hand, appearance and physical properties.

The foregoing object and others which will become apparent from the following description are accomplished in accordance with the invention, generally speaking, by providing glass fibers sized with linear polyarylcarbonates. Therefore, the present invention provides for glass fibers which have a more attractive appearance and especially pleasant hand similar to cotton which are sized with polyarylcarbonates. The sized glass fibers are suitable, inter alia, for decorative purposes such as for expensive glass fiber curtains as well as for technical uses for filters and the like.

By glass fiber materials, it is to be understood that glass silk, as well as all glass fiber materials derived therefrom including glass fiber fabrics, rovings, stable fibers and glass fiber mats, are included. In the production of glass fiber materials, glass batch is melted in continuous furnaces and usually formed into glass marbles. The glass marbles are then processed in a continuous filament operation by remelting them in small electric furnaces fitted with perforated platinum bushings on the lower face through which the glass flows by gravity. The fibers are taken up on a high speed winding device which draws the molten glass down to a fiber very much smaller than the diameter of the aperture through which it originally flowed. Fabrics woven from the glass yarn or the yarn itself may be treated with the process of the present invention. Alternately, the glass yarn may be subjected to heat cleaning, to remove organic material and release internal stresses of the yarn as well as to set the weave and give a limp hand and excellent draping quality to the fabric. The polycarbonate sizing of the present invention is advantageously applied at this stage in the production of the glass fibers. The polycarbonate sizing may be applied, however, at any stage in the production of fibers in order to overcome their submicroscopic porosity and high water vapor absorptivity.

Fibrous glass textiles which are suitable for electric purposes, which are resistant to chemical attack and preferably having a filament diameter between about 20 and about 40 inches x 10″–5″ are very suitable for use in accordance with the present invention.

Fibrous glass fabrics produced in accordance with the invention are useful for the manufacture of marguisette curtains and heavier printed and dyed drapery fabrics. They are also suitable for waterproofing applications and in the manufacture of glass insect screening as well as chemical applications as a filtering medium.

Any suitable polycarbonate and preferably a polyarylcarbonate and most preferably mixed polyarylcarbonates may be used for sizing the glass fibers in accordance with the present invention. Suitable polycarbonates for use as sizing are disclosed, for example, in U.S. Patent 3,028,365, British application 808,485, German application 1,007,996, U.S. Patent 2,997,459, British Patent 772,627, British Patent 808,486 and British Patent 808,487. As is evident from the patents, polycarbonates and preferably polyarylcarbonates to be employed as sizing in accordance with the present invention may be produced from aromatic phenols especially alkylidene bisphenols, alkylidene bis-hydroxy cycloalkanes, bis(hydroxy phenyl) ethers, bis-(hydroxy phenyl) sulfides, bis(hydroxy phenyl) sulphones, bis(hydroxy phenyl) sulfoxides and the like. It is also possible to use as sizing materials the polycarbonates based on mixtures of the foregoing bisphenols and the like with aromatic, aliphatic or cycloaliphatic dihydroxy compounds. In accordance with a preferred embodiment of the present invention, it has been found that polycarbonates based on beta-alkenyl substituted aromatic dihydroxy compounds, especially those polyarylcarbonates where the beta-alkenyl substituted aromatic dihydroxy compound amounts to up to about 25 mol percent of the total aromatic dihydroxy compound employed. Such high molecular weight polyarylcarbonates are disclosed in Belgium Patent 554,222. They can be produced by reacting a suitable mixture of a bispenol such as 2,2-bis (4-hydroxy phenyl) propane with up to about 25 mol percent of the total requirement of the phenol compound of a beta-alkenyl substituted aromatic dihydroxy compound such as 3-monodiallyl-4,4′-dihydroxy diphenyl or the like as more particularly set forth below.

The polycarbonate sizing which is applied to the glass fibers as pointed out below in solution or emulsion form is prepared by the well known and conventional methods reported in the foregoing patents and preferably based on the following raw materials. If the polycarbonate is prepared directly from phosgene and a bisphenol, it is satisfactory to dissolve the bisphenol in aqueous caustic as disclosed in German Patent 959,497 and form a polymer by introduction of phosgene. By combining the aqueous caustic solution with a solvent for the polymer, a growing polymer chain dissolves in the organic phase and the ionic ends continue to grow in the aqueous phase. After removal of the water and solvent a high grade polymer having an intrinsic viscosity of about 0.5 to about 1.5 in dioxan at 30° C. in essentially quantitative yield is obtained. Alternately, the polycarbonate may be produced by the transesterification route wherein a diarylcarbonate is reacted with a dihydroxy aromatic compound under conditions which favor the removal of the phenolic by-products in a well-stirred vacuum kettle. The polycarbonates are well known and the foregoing is set forth to aid in understanding the type of polycarbonates which are most suitable for use in accordance with the present invention. In the process, any suitable aromatic dihydroxy compound may be used such as, for example, hydroquinone, resorcinol, pyrocatechol, 4,4' dihydroxy diphenyl 1,5-dihydroxy naphthylene, alkylidene bisphenols, di(hydroxy phenyl) ethers, di(hydroxy phenyl) sulfides, di(hydroxy phenyl) sulfoxides, di(hydroxy phenyl) sulfones and the like; ethylene glycol, diethylene glycol, polyethylene glycol 400, thiodiglycol, ethylene dithiodiglycol, propane diol-1,2, propane diol-1,3, butane diol-1,3, butane diol-1,4, 2-methylpropane diol-1,3, pentane diol-1,5, hexane diol-1,6, octane diol-1,8, 2-ethyl hexane diol-1,3, decane diol-1,10, quinitol, cyclohexane diol-1,2, o, m and p-xylene glycol, 2,2-bis(4-hydroxy cylohexyl) propane, bis(4-hydroxy cyclohexyl) methane, 2,6-dihydroxy decahydronaphthylene. Typical of the beta-alkenyl substituted aromatic dihydroxy compounds are mono- and diallyl and methallyl hydroquinone. 3-mono and 3,3'-diallyl and methallyl 4,4'-dihydroxy diphenyl, 3-mono and 3,3'-diallyl and methallyl compounds of bis (4-hydroxy phenyl) alkanes such as bis(hydroxy phenyl) methane, ethane, propane, butane, cyclohexane, and the like as well as the bis(4-hydroxy phenyl) ethers, sulfides, sulfoxides and sulfones.

The sizing operation is carried out preferably by treating the glass fibers or the glass fiber textiles with dilute solutions or emulsions of the polycarbonate. It is preferred to use a solution or an emulsion which contains from about 0.5 to about 5 percent by weight of the polycarbonate. Suitable solvents are for example, aromatic hydrocarbons such as benzene, toluene, xylene, or the like but it is preferred to use low boiling chlorinated aliphatic hydrocarbons such as, for example, methylene chloride, ethylene chloride, chloroform, carbontetrachloride and the like. It is also possible in accordance with the invention to use the low boiling solvents in combination with high boiling solvents such as monochlorobenzene, dichlorobenzene, anisole, or the like. Aqueous polycarbonate dispersions suitable for use in accordance with the present invention are described in German Patent 1,041,245.

The sizing is most expediently applied directly during the production of the glass fiber as more particularly set forth above and in the following Example 1. However, a size and the polycarbonate can be applied as in Example 2 given below or a glass fiber which has been sized with another sizing agent as in Example 3 can have a polycarbonate sizing agent added thereto.

The mose preferred sizing for glass fibers for use in accordance with the present invention are polycarbonates based on mixtures of aromatic dihydroxy compounds free of substitution with up to about 25 mol percent of beta-alkenyl substituted aromatic dihydroxy compounds. A most preferred sizing is based on from 0.5 to 5 mol percent of 2,2-bis(4-hydroxy-3-allyl phenyl) propane and from 99.5 to 95 mol percent of 2,2-(4-hydroxy phenyl) propane or 1,1-bis(4-hydroxy phenyl) cyclohexane.

The size content of the fibres according to the invention should amount from about 0.5 to about 5 and preferably from about 1.0 to about 3 percent by weight.

The sized glass fibers of the present invention have a more attractive appearance and especially pleasant ahnd similar to cotton. The glass fibers sized with the polycarbonates are vastly improved over the heretofore known sized glass fibers because of their pleasant hand, improved appearance, and especially their tough abrasive resistance.

The invention is further illustrated but is not intended to be limited by the following examples in which all parts and percentages are by weight unless otherwise specified.

Example 1

Glass marbles with a low alkali content are melted and continuously spun into filaments of about 200 individual fibers of about 10 microns thickness. At a short distance from the nozzle, the individual fibers are drawn on a rotating roller through a trough. The trough contains an aqueous emulsion of polycarbonate which wets the individual fibers. After leaving the roller surface, about 100 individual fibers are combined into a fiber bundle which is spooled. The fibers dry immediately after leaving the roller. They are not sticky and possess a high gloss. They have a size content of about 1.8 percent by weight a very pleasant hand and good physical properties and tensile strength.

The aqueous emulsion of polycarbonate is prepared by combining about 1.5 parts of a polycarbonate prepared by reacting about 50 mol percent of 2,2-bis(4-hydroxy phenyl) propane and about 50 mol percent of 1,1-bis(4-hydroxy phenyl) cyclohexane with diphenylcarbonate. The resulting polycarbonate plastic has a relative viscosity at 25° C. of about 1.240 in approximately a 0.5 percent solution in methylene chloride. The 1.5 parts of polycarbonate are mixed with about 1.5 parts of a 1:1 mixture of ortho- and para-chlorotoluene, about 0.12 part of an emulsifier and 96.88 parts of water as disclosed in German Patent 1,041,245.

Example 2

A commercially available stable glass silk, with a so-called "chromium complex size," of an average cut length of 3 mm. (size content about 1.2%) is piled about 3 mm. high on a metal sheet and treated in an oven at about 400° C. After about 15–30 minutes, the coating begins to decompose with a brown coloration. After about 4–6 hours, the stable glass silk possesses a bright, shiny surface.

About 200 g. of the so-desired glass fiber are placed in about 2700 g. of a 1% solution of a polycarbonate based on 2,2-bis(4-hydroxy phenyl) propane (relative viscosity 1.313) in methylene chloride prepared as in Example 1 and stirred vigorously for 1 minute. The glass fibers, after having been dried for about 3 hours at about 80° C. on a metal sheet, possess a polycarbonate size of about 2%.

Example 3

A fiber consisting of about 200 individual spun filaments with a coating of about 0.8% butadiene-styrene copolymer is passed through a solution of 2 parts by weight in 100 parts by weight of methylene chloride of a high molecular polycarbonate based on bisphenol A prepared as in Example 2 with a relative viscosity of a 0.5% solution in methylene chloride at 25° C. of 1.313. The fiber leaving the solution is completely dry after a distance of only a few meters and does not stick.

Example 4

Example 1 is repeated but the mixed polycarbonate of that example is replaced by the mixed polycarbonate having a relative viscosity of about 1.215 in a 0.5 percent solution in methylene chloride at 25° C. obtained by reacting a mixture of 95 mol percent of bisphenol A and 5 mol percent of 2,2-bis(4-hydroxy-3-allyl phenyl)-propane with phosgene in known manner.

It is to be understood that the purpose of the foregoing working examples is to illustrate this invention and that providing that the teachings of this disclosure are followed any other suitable polycarbonate, solution of polycarbonate, emulsion, mixed polycarbonate, or the like could be used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A glass fiber sized with from about 0.5 to about 5 percent by weight of a polycarbonate.

2. The glass fiber of claim 1 wherein the polycarbonate is a linear polyarylcarbonate.

3. The glass fiber of claim 1 wherein the polycarbonate is a polyarylcarbonate based on bis(4-hydroxy phenyl) propane.

4. The glass fiber of claim 1 wherein the polycarbonate is a polyarylcarbonate based on 1,1 - bis(4 - hydroxy phenyl) cyclohexane.

5. The glass fiber of claim 1 wherein the polycarbonate is a polyarylcarbonate based on a mixed polycarbonate prepared from an aromatic dihydroxy compound mixed with a beta-alkenyl substituted aromatic dihydroxy compound.

6. Glass fibers sized with about 0.5 to about 5% by weight of a high molecular weight polycarbonate prepared from a dihydric phenol and phosgene or a diaryl carbonate and having an intrinsic viscosity of from about 0.5 to about 1.5 at 30° C. in dioxane.

7. A method of sizing glass fibers which comprises treating the fiber with a solution of from about 0.5 to about 5 percent by weight of a polycarbonate in an inert organic solvent therefor.

8. A method of sizing glass fibers which comprises treating the fiber with a solution of from about 0.5 to about 5 percent by weight of a polycarbonate in an inert organic solvent therefor immediately after the fiber is formed from the molten stage.

References Cited

UNITED STATES PATENTS

| | | | |
|---|---|---|---|
| 2,801,189 | 7/1957 | Collier | 117—126 |
| 2,997,459 | 8/1961 | Schnell et al. | 260—47 |
| 3,028,365 | 4/1962 | Schnell et al. | 260—47 X |
| 3,215,668 | 11/1965 | Bissinger et al. | 117—126 X |
| 3,221,025 | 11/1965 | Prochaska | 260—47 X |
| 3,248,415 | 4/1966 | Stevens | 260—47 X |

ALFRED L. LEAVITT, *Primary Examiner.*

H. COHEN, *Assistant Examiner.*